United States Patent
Keller et al.

(10) Patent No.: US 9,560,517 B2
(45) Date of Patent: Jan. 31, 2017

(54) METHOD AND APPARATUS FOR PROVIDING A SERVICE TO A ROAMING UE VIA A PACKET DATA NETWORK GATEWAY

(71) Applicant: TELEFONAKTIEBOLAGET L M ERICSSON (PUBL), Stockholm (SE)

(72) Inventors: Ralf Keller, Würselen (DE); Patrik Dannebro, Hisings Kärra (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 15 days.

(21) Appl. No.: 14/637,061

(22) Filed: Mar. 3, 2015

(65) Prior Publication Data
US 2016/0262006 A1    Sep. 8, 2016

(51) Int. Cl.
| H04W 4/00 | (2009.01) |
| H04W 8/10 | (2009.01) |
| H04W 12/08 | (2009.01) |
| H04L 29/06 | (2006.01) |

(52) U.S. Cl.
CPC .............. *H04W 8/10* (2013.01); *H04L 65/40* (2013.01); *H04W 12/08* (2013.01)

(58) Field of Classification Search
CPC .............. H04W 88/16; H04M 2215/34; H04M 2215/7442
USPC ...................................................... 455/432.1
See application file for complete search history.

(56) References Cited

U.S. PATENT DOCUMENTS

| 2004/0228347 A1 | 11/2004 | Hurtta et al. | |
| 2009/0047947 A1* | 2/2009 | Giaretta | H04W 48/17 455/432.1 |
| 2011/0171953 A1* | 7/2011 | Faccin | H04W 48/08 455/426.1 |
| 2012/0147872 A1* | 6/2012 | Zisimopoulos | H04W 8/12 370/338 |
| 2013/0279401 A1* | 10/2013 | Sander | H04W 48/18 370/328 |
| 2016/0088461 A1* | 3/2016 | Jiang | H04M 15/31 455/432.1 |

OTHER PUBLICATIONS

NTT DOCOMO, Clearification of MME behavior detail for IMS voice over PS session support indicator, SA WG2 Meeting #107 Change Request V13.1.0, Sorrent, Italy, Jan. 26-30, 2015.
Intel Corporation, PLMN indicator for control of mobile SM and ESM retries in PLMN change, 3GPP TSG CT WG1 Meeting #89, C1-144633, San Francisco (CA), USA, Nov. 17-21, 2014.

(Continued)

*Primary Examiner* — Timothy Pham

(57) ABSTRACT

A method of providing a service to a user equipment (UE) via a packet data network gateway (PDN GW), wherein the UE is served by a visited public land mobile network (V-PLMN) and wherein the UE has a subscription with a home public land mobile network (H-PLMN) comprising the steps of: providing, by a register in the H-PLMN, a H-PLMN-allowed indication, indicating whether a PDN GW in the H-PLMN is authorized to be selected for the UE for execution of the service, and providing, based on the H-PLMN-allowed indication, an indication to the UE, whether the UE can expect successful execution of the service.

25 Claims, 4 Drawing Sheets

(56) References Cited

OTHER PUBLICATIONS

3GPP TS 23.401 V13.1.0, 3rd Generation Partnership Project; Technical Specification Group Services and System Aspects; General Packet Radio Service (GPRS) enhancements for Evolved Universal Terrestrial Radio Access Network (E-UTRAN) access (Release 13), Dec. 2014.

NTT DOCOMO, Discussion on S8HR VoLTE Roaming, TSG SA WG2 #108, S2-150985, San Jose Del Cabo, Mexico, Apr. 13-17, 2015.

3GPP TS 22.173 V12.8.0, 3rd Generation Partnership Project; Technical Specification Group Services and System Aspects; IP Multimedia Core Network Subsystem (IMS) Multimedia Telephony Service and supplementary services; Stage 1 (Release 12), Dec. 2014.

3GPP TS 23.203 V132.0, 3rd Generation Partnership Project; Technical Specification Group Services and System Aspects; Policy and charging control architecture (Release 13), Dec. 2014.

3GPP TS 23.211 V13.0.0, 3rd Generation Partnership Project; Technical Specification Group Services and System Aspects; Architectural requirements (Release 13), Jun. 2014.

3GPP TS 23.292 V13.1.0, 3rd Generation Partnership Project; Technical Specification Group Services and System Aspects; IP Multimedia Subsystem (IMS) centralized services; Stage 2 (Release 13), Dec. 2014.

3GPP TS 29.303 V13.0.0, 3rd Generation Partnership Project; Technical Specification Group Core Network and Terminals; Domain Name System Procedures; Stage 3 (Release 13), Dec. 2014.

3GPP TS 23.060 V13.1.0, 3rd Generation Partnership Project; Technical Specification Group Services and System Aspects; General Packet Radio Service (GPRS); Service description; Stage 2 (Release 13); Dec. 2014.

3GPP TS 23.402 V13.0.0, 3rd Generation Partnership Project; Technical Specification Group Services and System Aspects; Architecture enhancements for non-3GPP accesses (Release 13), Dec. 2014.

3GPP TS 23.272 V12.4.0, 3rd Generation Partnership Project; Technical Specification Group Services and System Aspects; Circuit Switched (CS) fallback in Evolved Packet System (EPS); Stage 2 (Release 12), Sep. 2014.

* cited by examiner

METHOD AND APPARATUS FOR PROVIDING A SERVICE TO A ROAMING UE VIA A PACKET DATA NETWORK GATEWAY

TECHNICAL FIELD

The invention is related to a method and apparatus of providing a service to a user equipment, UE, via a packet data network gateway, PDN GW, wherein the UE is served by a visited public land mobile network, V-PLMN, and wherein the UE has a subscription with a home public land mobile network, H-PLMN.

BACKGROUND

In a typical cellular system, also referred to as a wireless communications network, communication network, Public Land Mobile Network (PLMN) or network, wireless terminals, also known as mobile stations and/or User Equipment units (UEs) communicate with a radio network node in a Radio Access Networks (RAN). The UE may be a mobile terminal by which a subscriber may access services offered by an operator's Core Network (CN) and services outside operator's network to which the operator's RAN and CN provide access. The radio access network covers a geographical area which is divided into cell areas, with each cell area being served by a base station, e.g. a Radio Base Station (RBS), which in some radio access networks is also called an evolved NodeB (eNB), eNode-B, B node or base station. The base station communicates over the air interface operating on radio frequencies with the user equipment(s) within range of the base station. The RAN may implement different Radio Access Technologies (RAT), such as Long Term Evolution (LTE), Global System for Mobile Communications (GSM), Universal Mobile Telecommunications System (UMTS), (Worldwide Interoperability for Microwave Access (WiMAX) etc.

In a roaming situation a UE which has a subscription to an operator of a home public land mobile network (H-PLMN) is served by a visited public land mobile network (V-PLMN). If the UE would like to use a service, like a Voice over IMS service, in the V-PLMN, it may send a request to a control node in the V-PLMN. The control node has to forward this request to a packet data network (PDN) gateway which connects the public land mobile network to a service providing network, which may be an operator Internet Protocol (IP) service network such as IP Multimedia Subsystem (IMS). The control node may select a PDN gateway (PDN GW) based on a roaming agreement between the operator of the V-PLMN and the operator of the H-PLMN for this specific UE. Further the control node may have some further indications to select the PDN GW.

3GPP Standard TS 23.401 V13.1.0 refers in chapter 4.3.8.1 to the PDN GW selection function. According to this standard the PDN GW selection function allocates a PDN GW that shall provide the PDN connectivity for the 3GPP access. The function uses subscriber information provided by the Home Subscriber Server (HSS) in the H-PLMN. The PDN subscription contexts provided by the HSS contain at least the identity of a PDN GW and an Access Point Name (APN) or an APN and an indication for this APN whether the allocation of a PDN GW from this V-PLMN is allowed. If the HSS provides the PDN subscription context that allows for allocation of a PDN GW from the V-PLMN and, optionally, the control node in the V-PLMN is configured to know that the V-PLMN has a suitable roaming agreement with the H-PLMN of the UE, the PDN GW selection function derives a PDN GW identity from the V-PLMN. If a PDN GW identity cannot be derived or if the subscription does not allow for allocation of a PDN GW from the V-PLMN then the APN is used to derive a PDN GW identity from the H-PLMN.

Standard GSMA PRD IR.92 V 8.0 has specified that for a roaming UE which is served by a V-PLMN and has a subscription to an H-PLMN, only a roaming model with a PDN GW in the V-PLMN applies. This roaming model is described in GSMA PRD IR.65 V 8.0 and GSMA PRD IR.88 V 9.0. Hence the control node of the V-PLMN needs to know that local breakout is allowed for a roaming UE in order to be able to set the IMS voice over PS Session Support Indication. The GSMA PRD IR.92 standard has specified that the HSS in the H-PLMN sets a "V-PLMN Address Allowed" (VPAA) parameter when enabling IMS roaming with the V-PLMN wherein the particular subscriber is an IMS subscriber that requires a PDN GW in the V-PLMN as described in GSMA PRD IR.88.

Hence home operator can use the VPAA to indicate that the subscriber is an IMS subscriber authorized for VoLTE roaming by allowing the V-PLMN to select a PDN GW in the V-PLMN and thereby allowing the V-PLMN to send the IMS voice over PS Session Support Indication for indicating that the UE can expect successful execution of the VoLTE service. It is also possible that the home operator can use the VPAA to indicate that the IMS subscriber is not authorized for VoLTE roaming by denying the V-PLMN to select a PDN GW in the V-PLMN and thereby prevent the V-PLMN from sending the IMS voice of PS Session Support Indication. The VPAA is the only indication that H-PLMN can use to steer the behavior of the V-PLMN, while still allowing the UE to connect to the IMS APN. If the VPAA which is received by the control node of the V-PLMN from the HSS in the H-PLMN is set to "allowed" then the control node does not know if a PDN GW 105 in the V-PLMN should be selected even if the roaming model uses a PDN GW in the H-PLMN. This concept has been named as S8HR (S8 Home routed). If the VPAA is set to "not allowed" the control node must select a PDN GW in the H-PLMN. In this case there is no indication from the H-PLMN if the UE has subscribed to an IMS roaming service and can expect a successful IMS Voice over PS session. I.e. there is no indication from the H-PLMN if the control node in the V-PLMN shall set the Voice over PS Session Support Indication to the UE. This may result in that the control node indicates Voice over PS Session Support to the UE even if the subscriber is not an IMS subscriber for voice and the UE would establish unnecessarily a PDN connection and try to register in the IMS. It may also be possible that this may result in that a roaming UE has a roaming subscription and may not receive the Voice over PS Session Support Indication and will hence not use VoLTE when roaming.

SUMMARY

It is an object of the present invention to improve the provisioning of a service to a roaming user equipment. This object is achieved by the independent claims. Advantageous embodiments are described in the dependent claims.

According to a first aspect, a method of providing a service to an user equipment, UE, via a packet data network gateway, PDN GW, is provided. The UE is served by a visited public land mobile network, V-PLMN, and the UE has a subscription with a home public land mobile network, H-PLMN. The method comprises the step of providing, by a register in the H-PLMN, a H-PLMN-allowed indication, indicating whether a PDN GW in the H-PLMN is authorized to be selected for the UE for execution of the service. The method comprises the further step of providing, based on the H-PLMN-allowed indication, an indication to the UE, whether the UE can expect successful execution of the service.

According to second aspect, a control node in a visited public land mobile network, V-PLMN, serving an user equipment, UE, which has a subscription with a home public land mobile network, H-PLMN, is provided. The control node is adapted to receive a request for a service from the UE and to receive an H-PLMN-allowed indication indicating whether a packet data network gateway, PDN GW, in the H-PLMN is authorized to be selected for the UE for execution of the service. The control node is further adapted to provide, based on the H-PLMN-allowed indication, an indication to the UE, whether the UE can expect successful execution of the service.

According to a third aspect, a method in a control node of a visited public land mobile network, V-PLMN, serving a user equipment, UE, which has a subscription with a home public land mobile network, H-PLMN, is provided. The method comprises the steps of receiving a request for a service from the UE, receiving a H-PLMN-allowed indication indicating whether a packet data network gateway, PDN GW, in the H-PLMN is authorized to be selected for the UE for execution of the service and providing, based on the H-PLMN-allowed indication, an indication to the UE, whether the UE can expect successful execution of the service.

According to a forth aspect, a register in a home public land mobile network, H-PLMN, storing subscription data of a user equipment, UE, which has a subscription with the H-PLMN, is provided. The register is adapted to store a H-PLMN-allowed indication, indicating whether a packet data network gateway, PDN GW, in the H-PLMN is authorized to be selected for the UE for execution of the service. The register is further adapted to provide the H-PLMN-allowed indication to a control node of a visited PLMN, V-PLMN which serves the UE.

According to a fifth aspect a method in a register of a home public land mobile network, H-PLMN, storing subscription data of a user equipment, UE, which has a subscription with the H-PLMN, is provided. The method comprises the steps of storing a H-PLMN-allowed indication, indicating whether a packet data network gateway, PDN GW, in the H-PLMN is authorized to be selected for the UE for execution of the service and providing the H-PLMN-allowed indication to a control node of a visited PLMN, V-PLMN which serves the UE.

The present invention also concerns computer programs comprising portions of software codes or instructions in order to implement the method as described above when operated by at least one respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

BRIEF DESCRIPTION OF THE FIGURES

In the following, the invention will further be described with reference to exemplary embodiments illustrated in the figures, in which.

DETAILED DESCRIPTION

Figure 1:
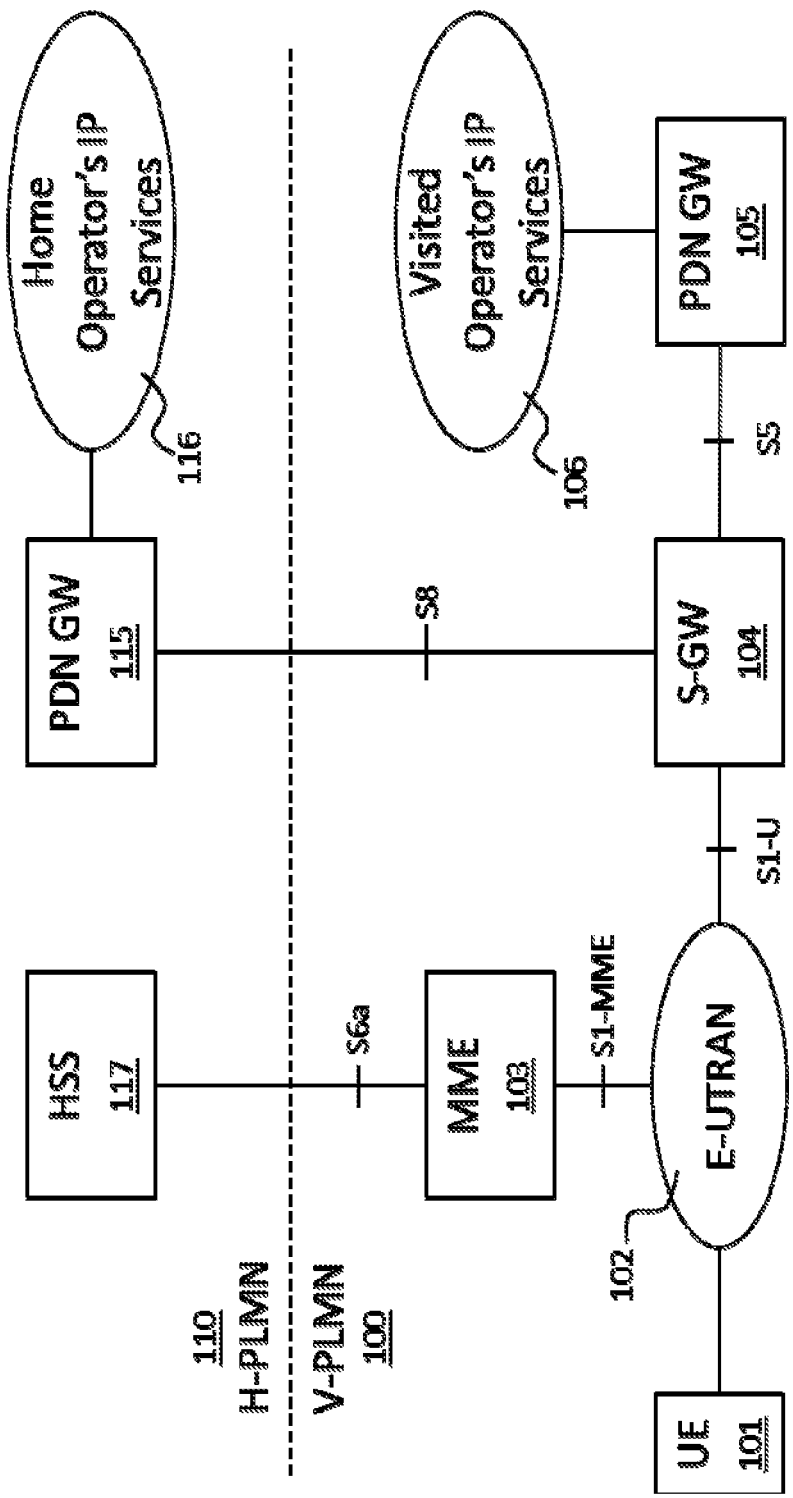
FIG. 1 shows a block diagram illustrating embodiments of roaming architecture for LTE/EPC.

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with LTE/EPC standard terminology to illustrate the present invention, they are equally applicable to other kinds of mobile communication systems. Also, the invention may be practiced in any network to which mobile users may attach.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G, GSM, 3G, WCDMA, CDMA, LTE, WLAN, Wi-Fi), mobile backhaul network, or core network such as IMS, CS Core, PS Core.

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a packet core network a control node may be a MME (Mobility Management Entity), SGSN (Serving Gateway Support Node), P-CSCF (Proxy Call State Control Function), S-CSCF (Serving-CSCF), or TAS (Telephony Application Server) node.

Within the context of the present application a PDN Gateway (PGW) or PDN GW is a node which provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception and packet screening.

Within the context of the present application the request for a service may refer to an initial attach or to a standalone PDN connectivity request, i.e. a request for service to a specific PDN.

The illustration in the drawing is schematic. In different drawings, similar or identical elements are provided with the same reference signs or with reference signs which are different from one another in the first digit.

The Long Term Evolution (LTE)/Evolved Packet Core (EPC) architecture supports Packet Switched (PS) roaming, as illustrated in FIG. 1, and is similar to the one deployed for Global System for Mobile communications (GSM) and Wideband Code Division Multiple Access, (WCDMA).

FIG. 1 is a block diagram illustrating embodiments of the architecture of a communication network comprising a Home Public Land Mobile Network (H-PLMN) 110 and a Visited Public Land Mobile Network (V-PLMN) 100. The H-PLMN 110 refers to the network being registered as the home of a user equipment (UE) 101. The UE 101 may roam between for example the H-PLMN 110 and the V-PLMN 100. The V-PLMN 100 comprises Evolved-UMTS Terrestrial Radio Access Network (E-UTRAN) 102 on the access side and Evolved Packet Core (EPC) on the core side. E-UTRAN 102 is the air interface of LTE. The E-UTRAN 102 comprises base stations, such as e.g. eNodeBs (not shown), which interfaces with user equipment(s). For illustration purposes only, the H-PLMN 110 and the V-PLMN 100 are separated by a dotted line.

The H-PLMN 110 comprises a Home Subscriber Server (HSS) 117, a home PDN GW 115. The PDN GW 115 in the H-PLMN 110 and the PDN GW 105 in the V-PLMN 100 are connected to packet data networks 106, 116 providing operator Internet Protocol (IP) Services such as IP Multimedia Subsystem (IMS), PSS etc. IMS is an architectural framework for delivering Internet Protocol (IP) multimedia services, like Voice over IMS or Voice over IP.

The HSS 117 is a database comprising subscription data and authentication data. The HSS 117 is connected to a mobile management entity (MME) 103 in the V-PLMN 100 via an S6a interface. The MME 103 is for example responsible for choosing the appropriate PDN GW 105, 115 for a user equipment data session. The PDN GW 115 in the H-PLMN 115 is the node in the H-PLMN 110 that allocates and reserves IP addresses to user equipment. The PDN GW 115 also takes care of policy and charging enforcement.

The V-PLMN 100 comprises further a Serving Gateway (SGW) 104 which routes and forwards user data packets, while also acting as the mobility anchor for the user plane during inter-eNB handovers and as the anchor for mobility between LTE and other 3GPP technologies. The SGW 104 is connected via a S1-U interface with the E-UTRAN 102 of the V-PLMN 100. Further the SGW 104 in the V-PLMN 100 is connected to the PDN GW 115 in the H-PLMN 110 via an S8 interface. The S8 interface is an inter-public land mobile network reference point providing user and control plane between the SGW 104 in the V-PLMN 100 and the PDN GW 115 in the H-PLMN 110. The V-PLMN 100 further comprises a PDN GW 105. The PDN GW 105 in the V-PLMN 100 also takes care of policy and charging enforcement.

The UE 101 which is adapted to use a Voice over IP service in IMS is depending on an IMS voice over Packet Switched (PS) Session Supported Indication to get an indication whether it can expect a successful IMS voice over IP session to place and receive Voice over IP services and calls.

Figure 2:
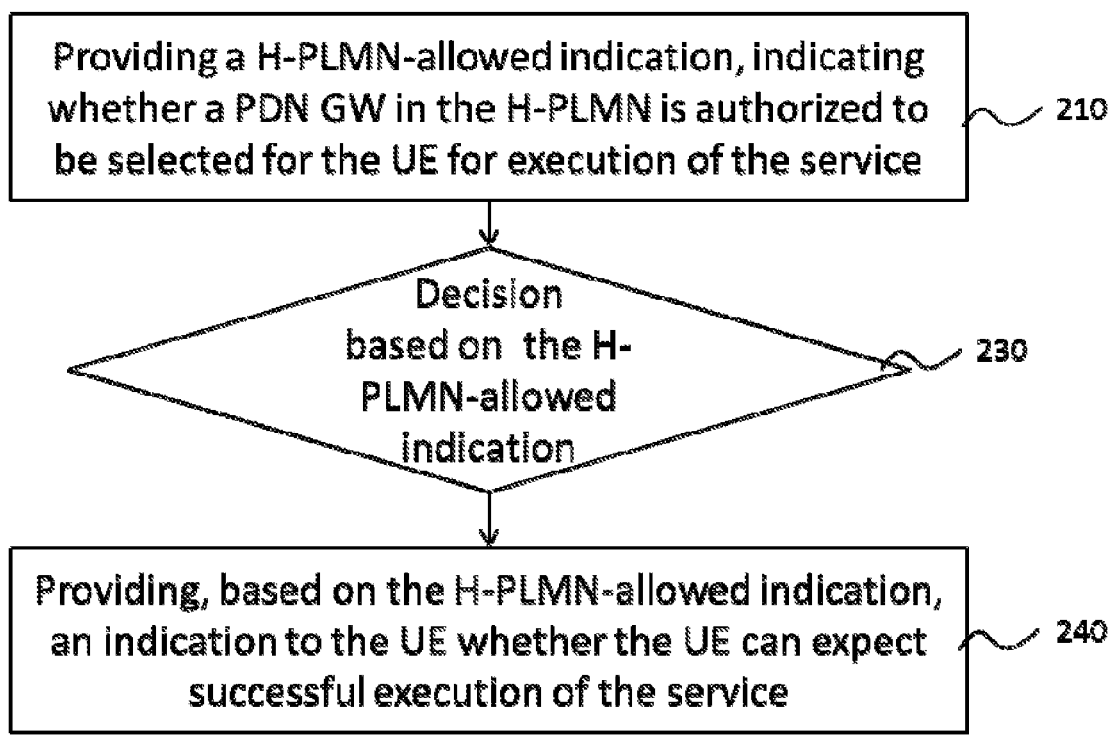
FIG. 2 shows a flow chart illustrating one embodiment of a method according to the invention.

FIG. 2 shows a flow chart illustrating one embodiment of a method of providing a service to a UE 101 which is served by a V-PLMN. A UE 101 is served by the V-PLMN when the V-PLMN is providing access to the mobile communication network or PLMN. The UE 101 is connected to the access network of the V-PLMN 100 which is controlled by the core network node 103 of the V-PLMN 100. Further the UE 101 has a subscription with a H-PLMN 110. In a first step 210 a H-PLMN-allowed indication, indicating whether a PDN GW 115 in the H-PLMN 110 is authorized to be selected for the UE 101 for execution of the service. The service may be a Voice over IP multimedia subsystem (IMS) service or any other kind of service which can be provided by the IMS to a UE 101 which has a subscription to IMS. The Voice over IMS service may also be denoted as a Voice over LTE (VoLTE) service or a Voice over IP (VoIP) service. The H-PLMN-allowed indication may be provided by a register 117 in the H-PLMN 110. The register 117 in the H-PLMN 110 may be a Home Subscriber Server (HSS). Further the H-PLMN-allowed indication may be encapsulated in a PDN subscription context comprising Subscriber data according to 3GPP TS 23.401 V13.1.0, provided by the register 117 in the H-PLMN 110 for the UE 101. The indication may be provided to a control node 103 in the V-PLMN 100 which can be a MME in an EPC network In a next step 230 a decision is made based on the H-PLMN-allowed indication whether to provide an indication to the UE 101 whether the UE 101 can expect successful execution of the service. If no H-PLMN-allowed indication has been provided by the register 117 no indication about the successful execution of the service may be provided to the UE 101. In another embodiment the decision whether or not to provide an indication to the UE 101 whether the UE 101 can expect successful execution of the service may be dependent on a further indicator for the register.

In a next step 240 an indication is provided to the UE 101 whether the UE 101 can expect successful execution of the service. If the UE 101 receives this indicator of a successful execution of the service, the UE 101 will try to establish the service. If e.g. a VoIMS service has been requested by the UE 101 and the UE 101 receives an indicator indicating that the UE can expect a successful execution of the service, the UE 101 will try to establish a VoIMS session. If the UE 101 receives an indication indicating that the UE 101 cannot expect successful execution of the service the UE 101 will not proceed with the establishment of a VoIMS connection but instead try to establish a normal CS voice session over another CS network which may also cover the same area in which the UE 101 is currently located.

Figure 3:
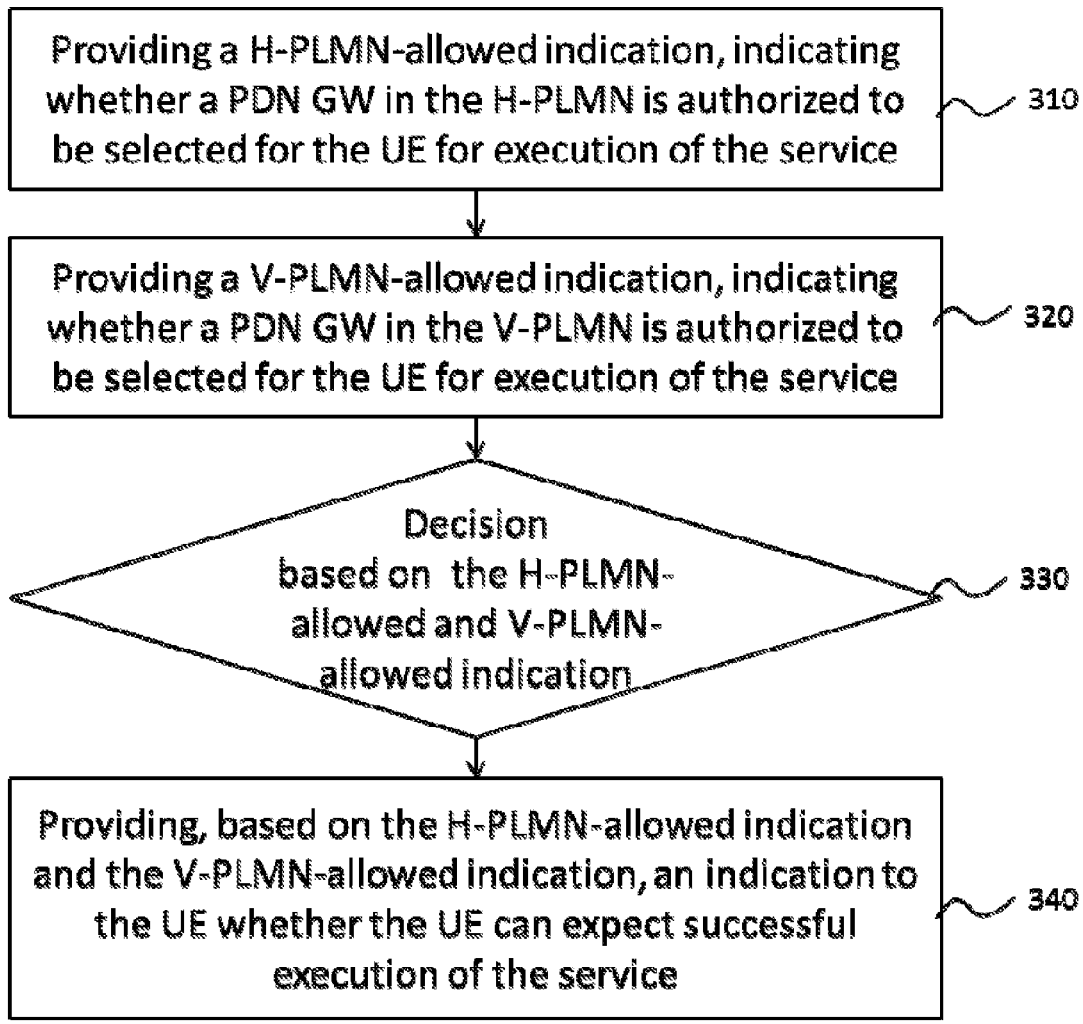
FIG. 3 shows a flow chart illustrating one embodiment of a method according to the invention.

According to a further embodiment in FIG. 3 two indications are provided by the register 117 in the H-PLMN 110.

In a first step 310 a H-PLMN-allowed indication is provided, indicating whether a PDN GW 115 in the H-PLMN 110 is authorized to be selected for the UE 101 for execution of the service. In a next step 320 a V-PLMN-allowed indication is provided, indicating whether a PDN GW 105 in the V-PLMN 100 is authorized to be selected for the UE 101 for execution of the service. The V-PLMN-allowed indication may be a V-PLMN Address Allowed (VPAA) parameter. Both indications may be encapsulated in a PDN subscription context, provided by the register 117 in the H-PLMN 110. Both indications may be provided to a control node 103 in the V-PLMN 100 which can be a MME in an EPC network.

In a next step 330 a decision is made based on the H-PLMN-allowed indication and the V-PLMN-allowed indication. This decision may also be executed in the control node 103 of the V-PLMN 100. The result of the decision is whether or not to provide in step 340 an indication to the UE 101 whether the UE 101 can expect successful execution of the service.

For deciding upon sending the indication to the UE 101 whether the UE 101 can expect successful execution of the requested service the control node 103 can now take into account the permission setting in the H-PLMN 110 and the V-PLMN 100. The control node 103 has therefore in the complete picture of the permission status in its own network 100 and in the H-PLMN 110 of the UE 101.

According to an embodiment of the invention an indication to the UE 101 is provided indicating that the UE 101 cannot expect successful execution of the service if the V-PLMN-allowed indication and the H-PLMN-allowed indication indicate that a PDN GW 105 in the V-PLMN 100 and a PDN GW 115 in the H-PLMN 110 are not authorized to be selected for the UE 101 for execution of the service. This may happen by sending a negative indication or by not sending any indication at all to the UE 101.

According to another embodiment of the invention the indication to the UE 101 indicating that the UE 101 can expect successful execution of the service may be provided if at least one of the V-PLMN-allowed indication or the H-PLMN-allowed indication indicates that a PDN GW 105 in the V-PLMN 100 or a PDN GW 115 in the H-PLMN 110 are authorized to be selected for the UE 101 for execution of the service. If the UE 101 is authorized to use at least one or both PDN GWs 105, 115 in the V-PLMN 100 and the H-PLMN 110 a successful execution of the service can be expected by the UE 101.

According to another embodiment of the invention the selection of the PDN GW 105, 115 for routing the service request to the selected PDN GW 105, 115 is executed based on the H-PLMN-allowed indication and the V-PLMN-allowed indication in a prioritized order. The selection of the PDN GW 105, 115 may be executed in a control node 103 in the V-PLMN 100. This control node 103 may be a MME or SGSN or any other control node in the PS core network which is responsible for choosing the gateways for service execution. After the control node 103 in the V-PLMN 100 has decided if a PDN GW 105 in the V-PLMN 100 or a PDN GW 115 in the H-PLMN 110 should be used for execution of the requested service then the control node 103 may add an operator identifier to the Access Point Name (APN) that has been provided by the UE 101 or by the HSS 117. If the PDN GW 115 in the H-PLMN 110 has been selected then the control node 103 requests an address from a Data Name Server, DNS, in its own network (V-PLMN) 100. The DNS in the V-PLMN 100 may query the DNS in the H-PLMN 110 to get the address of the PDN GW 115 in the H-PLMN 110 for routing the request to the received address. Selecting a PDN GW 05, 115 in prioritized order means that the control node 103 determines the values of the H-PLMN-allowed indication and the V-PLMN-allowed indication in a priority order. According to one embodiment the selection of the PDN GW 105, 115 for routing the service request to the selected PDN GW 105, 115 is executed by first selecting a PDN GW 115 in the H-PLMN 110 if the H-PLMN-allowed indication indicates that a PDN GW 115 in the H-PLMN 110 is authorized to be selected for the UE 101 for execution of the service, and if this indication is negative, selecting a PDN GW 105 in the V-PLMN 100 if the V-PLMN-allowed indication indicates that a PDN GW 105 in the V-PLMN 100 is authorized to be selected for the UE 101 for execution of the service.

According to another embodiment the selection of the PDN GW 105, 115 for routing the service request to the selected PDN GW 105, 115 is executed by first selecting a PDN GW 105 in the V-PLMN 100 if the V-PLMN-allowed indication indicates that a PDN GW 105 in the V-PLMN 100 is authorized to be selected for the UE 101 for execution of the service, and if this indication is negative, selecting a PDN GW 115 in the H-PLMN 110 if the H-PLMN-allowed indication indicates that a PDN GW 115 in the H-PLMN 110 is authorized to be selected for the UE 101 for execution of the service. If the V-PLMN-allowed indication and the H-PLMN-allowed indication both indicate that a PDN GW 115 in the H-PLMN 110 and a PDN GW 105 in the V-PLMN 100 are authorized to be selected for the UE 101 for execution of the service then the prioritized selection of the PDN GW 105, 115 may result in different gateways dependent on the PLMN-allowed indicator which has been determined first. By defining a priority order it is possible to set a preference in the V-PLMN 100 on how to handle a roaming UE 101. This preference may also be based on the roaming agreement between the V-PLMN 100 and the H-PLMN 110 for the UE 101. It may also be possible to set any other preference in the control node 103 for selecting a PDN GW 105, 115 in the V-PLMN or the H-PLMN.

According to another embodiment of the invention the preference in the V-PLMN 100 for selecting a PDN GW 105, 115 in the V-PLMN 100 or in the H-PLMN 110 may also be based on the Access Point Name, APN, provided by the UE 101. This APN may comprise additional information or may be a complete different and specific APN like ("IMS-home-routed" or "IMS-LBO").

The preference in the V-PLMN 100 for selecting a PDN GW 105, 115 may be different if the APN has been provided by the UE 101 or if the IMS APN is an APN which is used as a default APN for the UE 101. As an advantage the UE 101 may be able to steer the selection of a PDN GW 105, 115 in the V-PLMN 100 or the H-PLMN 110.

According to another embodiment of the invention if both indicators (H-PLMN-allowed and V-PLMN-allowed) indicate that both PDN GWs 105, 115 in the H-PLMN 110 and in the V-PLMN 100 are authorized to be selected for the UE 101 for execution of the service, the not selected PDN GW 105, 115 (non-preferred PDN GW) in the V-PLMN 100 or H-PLMN 110 can be defined as a fallback gateway which can be selected if the preferred PDN GW 105, 115 which has been selected based on preferences or other parameters is not able to provide the requested service to the UE 101. The non-selected PDN GW 105, 115 may be used as a fallback PDN GW 105, 115 which can replace the previous selected PDN GW 105, 115 very fast if the previous selected PDN GW 105, 115 is e.g. in an overload condition or is not accessible any more due to outages in the network. The advantage of having a fallback PDN GW 105, 115 is that in case the selected PDN GW 105, 115 cannot provide the service there is no need for a repetition of the determination of a service providing PDN GW 105, 115. The control node just may switch to the fallback PDN GW 105, 115.

Table 1 shows a decision matrix which may be stored in a control node of the V-PLMN 100:

TABLE 1

| V-PLMN-allowed | H-PLMN-allowed | Result: |
|---|---|---|
| Allowed | Allowed | Success indicator to UE: yes PDN GW acc. to preference in V-PLMN |
| Allowed | Not Allowed | Success indicator to UE: yes PDN GW in V-PLMN |
| Not Allowed | Allowed | Success indicator to UE: yes PDN GW in H-PLMN |
| Not Allowed | Not Allowed | Success indicator to UE: no APN: Home routed |

If both indicators indicate that PDN GW 105, 115 in V-PLMN 100 and H-PLMN 110 are not allowed (last row) there will be no indicator to the UE 101 that the UE 101 can expect successful execution of the requested service. Nevertheless the service request will be routed to the H-PLMN 110 to use other services in the H-PLMN 110 to keep the UE 101 registered in IMS even if the specific requested service is not available. If the requested service is a Voice over IMS service and both indicators are negative the UE 101 may use a CS connection to establish a voice session.

Figure 4:
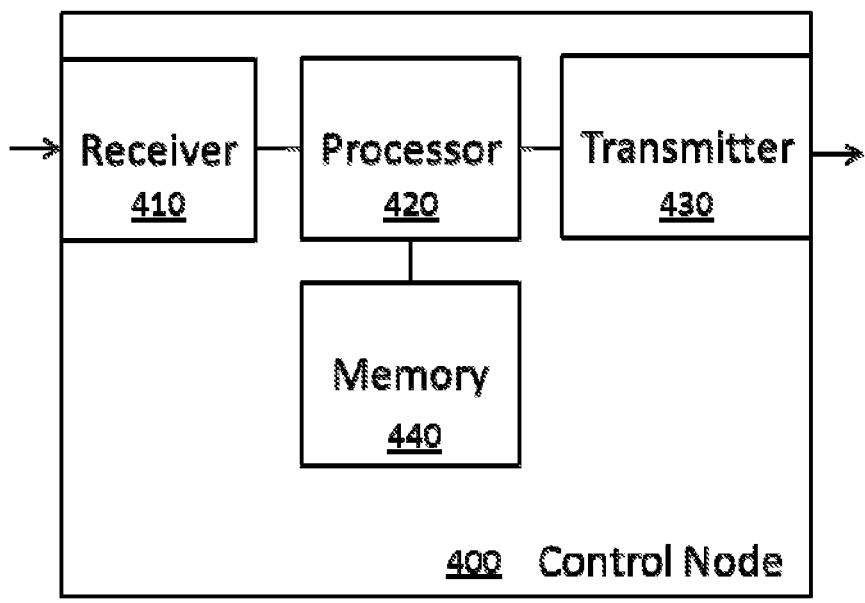
FIG. 4 shows a block diagram illustrating embodiments of a control node.

FIG. 4 shows a block diagram illustrating embodiments of a control node 400 in a V-PLMN according to an embodiment of the invention. The control node 400 may be a MMS or SGSN node. The control node 400 is adapted to serve a UE which has a subscription to a H-PLMN via an access network. The control node 400 comprises a receiver 410 which is adapted to receive a request for a service from the UE. This request may be encapsulated in another message or it may be a specific service request. The request is received via a node in the access network which currently serving the UE. The receiver 410 is further adapted to receive a H-PLMN-allowed indication indicating whether a PDN GW in the H-PLMN is authorized to be selected for the UE for execution of the service. The H-PLMN-allowed indication may be encapsulated in a PDN subscription context, received from a register in the H-PLMN via the core network. From this H-PLMN-allowed indication the control node 400 is aware whether the operator has authorized the use of a PDN GW in the H-PLMN of the UE. The control node 400 comprises a processor 420 which is adapted to make a decision based on the received H-PLMN-allowed indication and the service request to provide, via a transmitter 430, an indication to the UE, whether the UE can expect successful execution of the requested service.

In a further embodiment of the invention the control node 400 is further adapted to receive, via the receiver 410, a V-PLMN-allowed indication indicating whether a PDN GW in the V-PLMN is authorized to be selected for the UE for execution of the service. The processor 420 will make a decision about the sending of the indicator to the UE, whether the UE can expect successful execution of the service wherein this decision is now additionally based on the V-PLMN-allowed indication.

According to one embodiment of the invention if at least one of the V-PLMN-allowed indication or H-PLMN-allowed indication indicates that the PDN GW in the V-PLMN or the PDN GW in the H-PLMN is authorized to be selected for the UE for execution of the service the processor 420 will come to the result to send the indication via the transmitter 430 to the UE indicates that the UE can expect a successful execution of the service.

According to one embodiment of the invention if the V-PLMN-allowed indication and the H-PLMN-allowed indication indicate that the PDN GWs in the V-PLMN and in the H-PLMN are not authorized to be selected for the UE for execution of the service the processor 420 will come to the result not to send the indication to the UE or to send, via the transmitter 430 the indication to the UE indicating that the UE cannot expect a successful execution of the service.

According to another embodiment of the invention the control node 400 is further adapted to route the service request via the transmitter 420 to the PDN GW of the V-PLMN if the V-PLMN-allowed indication indicates that the PDN GW in the V-PLMN is authorized to be selected for the UE for execution of the service and the H-PLMN-allowed indication indicates that the PDN GW in the H-PLMN is not authorized to be selected for the UE for execution of the service.

According to another embodiment of the invention the control node 400 is further adapted to route the service request to the PDN GW of the H-PLMN if the H-PLMN-allowed indication indicates that the PDN GW in the H-PLMN is authorized to be selected for the UE for execution of the service and the V-PLMN-allowed indicator indicates that the PDN GW in the V-PLMN is not authorized to be selected for the UE for execution of the service.

According to another embodiment of the invention the control node 400 is further adapted to route the service request to a PDN GW in the H-PLMN or to a PDN GW in the V-PLMN in accordance with a preference indication, stored in a memory 440 if the H-PLMN-allowed indication and the V-PLMN-allowed indication indicate that the PDN GWs in the V-PLMN and in the H-PLMN are authorized to be selected for the UE for execution of the service.

It is to be understood that the structure as illustrated in FIG. 4 is merely schematic and that the control node 400 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated.

Figure 5:
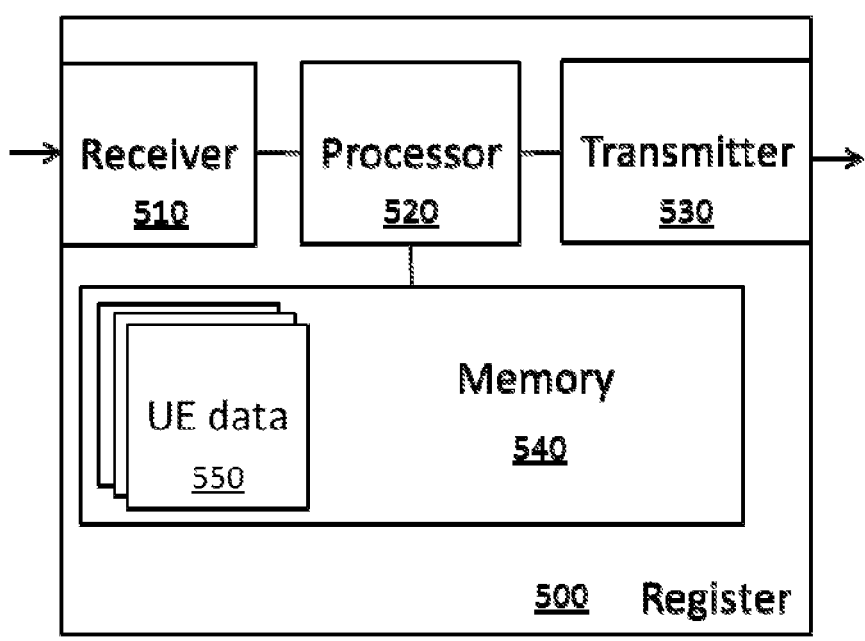
FIG. 5 shows a block diagram illustrating embodiments of a register.

FIG. 5 shows a block diagram illustrating embodiments of a register 500 in the H-PLMN of a UE. The register 500 may be a Home Subscriber Server, HSS, or any other storage which comprises subscription data for a UE. The register 500 comprises a memory 540 which is adapted to store subscription data 550 of several UEs which have a subscription to the operator of the H-PLMN in which the register 500 is located. One part of the subscription data 550 of a UE is the H-PLMN-allowed indication which indicates whether a PDN GW in the H-PLMN is authorized to be selected for the UE for execution of the service. The register 500 further comprises a receiver 510 which is adapted to receive a request from a control node for providing the H-PLMN-allowed indication to the requesting control node. The register 500 further comprises a processor which is adapted to control the memory 540 in the register 500. The register 500 further comprises a transmitter 530 which is adapted to provide the H-PLMN-allowed indication to a control node of a visited PLMN, V-PLMN which currently serves the UE. This H-PLMN-allowed indication may be provided via the transmitter to a control node in the V-PLMN in a PDN subscription context.

According to another embodiment of the invention the register 500 may also comprise in the UE data 550 a V-PLMN-allowed indication which indicates whether a PDN GW in the V-PLMN is authorized to be selected for the UE for execution of the service. This indication may also be provided via the transmitter 530 to a control node in the V-PLMN using a PDN subscription context.

It is to be understood that the structure as illustrated in FIG. 5 is merely schematic and that the register 500 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

The present invention also concerns computer programs comprising portions of software codes or instructions in order to implement the method as described above when operated by at least one respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

The invention claimed is:

1. A method of providing a service to a user equipment (UE) via a packet data network gateway (PDN GW), wherein the UE is served by a visited public land mobile network (V-PLMN), and wherein the UE has a subscription with a home public land mobile network (H-PLMN) comprising the steps of:
   providing, by a register in the H-PLMN, a H-PLMN-allowed indication, indicating whether a PDN GW in the H-PLMN is authorized to be selected for the UE for execution of the service;
   providing, by the register in the H-PLMN of the UE, a V-PLMN-allowed indication, indicating whether a PDN GW in the V-PLMN is authorized to be selected for the UE for execution of the service; and
   providing, based on the H-PLMN-allowed indication and the V-PLMN-allowed indication, an indication to the UE, whether the UE can expect successful execution of the service,
   wherein selection of the PDN GW for routing a service request to the selected PDN GW is executed based on the H-PLMN-allowed indication and the V-PLMN-allowed indication in a prioritized order.

2. The method according to claim 1, wherein the V-PLMN-allowed indication and the H-PLMN-allowed indication are encapsulated in a PDN subscription context, provided by the register in the H-PLMN for the UE.

3. The method according to claim 1, wherein the indication to the UE indicates that the UE can expect a successful execution of the service if at least one of the V-PLMN-allowed indication or H-PLMN-allowed indication indicates that the PDN GW in the V-PLMN or in the H-PLMN is authorized to be selected for the UE for execution of the service.

4. The method according to claim 1, wherein the selection of the PDN GW for routing the service request to the selected PDN GW is executed by first selecting a PDN GW in the H-PLMN if the H-PLMN-allowed indication indicates that a PDN GW in the H-PLMN is authorized to be selected for the UE for execution of the service, and if this indication is negative, selecting a PDN GW in the V-PLMN if the V-PLMN-allowed indication indicates that a PDN GW in the V-PLMN is authorized to be selected for the UE for execution of the service.

5. The method according to claim 1, wherein the selection of the PDN GW for routing the service request to the selected PDN GW is executed by first selecting a PDN GW in the V-PLMN if the V-PLMN-allowed indication indicates that a PDN GW in the V-PLMN is authorized to be selected for the UE for execution of the service, and if this indication is negative, selecting a PDN GW in the H-PLMN if the H-PLMN-allowed indication indicates that a PDN GW in the H-PLMN is authorized to be selected for the UE for execution of the service.

6. The method according to claim 1, wherein the indication to the UE indicates that the UE cannot expect a successful execution of the service if the V-PLMN-allowed indication and the H-PLMN-allowed indication indicate that the PDN GWs in the V-PLMN and the H-PLMN are not authorized to be selected for the UE for execution of the service.

7. The method according to claim 1, wherein the service is a voice over an IP multimedia subsystem (IMS) service and wherein the indication to the UE is a Voice over PS Session Support Indication.

8. The method according to claim 1, wherein the V-PLMN-allowed indication is a V-PLMN Address Allowed (VPAA) parameter.

9. The method according to claim 1, wherein if the V-PLMN-allowed indication and the H-PLMN-allowed indication indicate that a PDN GW in the H-PLMN and a PDN-GW in the V-PLMN are authorized to be selected for the UE for execution of the service then the selection of the serving PDN GW is based on a preference in the V-PLMN.

10. The method according to claim 9, wherein the preference in the V-PLMN is based on the Access Point Name (APN) provided by the UE.

11. The method according to claim 1, wherein if the V-PLMN-allowed indication and the H-PLMN-allowed indication indicate that a PDN GW in the H-PLMN and a PDN-GW in the V-PLMN are authorized to be selected for the UE for execution of the service then a PDN-GW in a non-preferred PLMN is selected as a fallback PDN GW if the serving PDN GW in the preferred PLMN is not able to serve the UE.

12. A non-transitory computer readable medium comprising a computer program, comprising instructions which, when executed on at least one processor, cause the at least one processor to carry out the method according to claim 1.

13. A control node in a visited public land mobile network (V-PLMN) serving a user equipment (UE), wherein the UE has a subscription with a home public land mobile network (H-PLMN), and wherein the control node is adapted to:
   receive a request for a service from the UE;
   receive a H-PLMN-allowed indication indicating whether a packet data network gateway (PDN GW) in the H-PLMN is authorized to be selected for the UE for execution of the service;

receive a V-PLMN-allowed indication indicating whether a PDN GW in the V-PLMN is authorized to be selected for the UE for execution of the service; and provide, based on the H-PLMN-allowed indication and the V-PLMN-allowed indication, an indication to the UE, whether the UE can expect successful execution of the service, wherein selection of the PDN GW for routing a service request to the selected PDN GW is executed based on the H-PLMN-allowed indication and the V-PLMN-allowed indication in a prioritized order.

14. The control node according to claim 13, wherein the indication to the UE indicates that the UE can expect a successful execution of the service if at least one of the V-PLMN-allowed indication or H-PLMN-allowed indication indicates that the PDN GW in the V-PLMN or the PDN GW in the H-PLMN is authorized to be selected for the UE for execution of the service.

15. The control node according to claim 13, wherein the indication to the UE indicates that the UE cannot expect a successful execution of the service if the V-PLMN-allowed indication and the H-PLMN-allowed indication indicate that the PDN GWs in the V-PLMN and in the H-PLMN are not authorized to be selected for the UE for execution of the service.

16. The control node according to claim 13, wherein the control node is further adapted to route the service request to the PDN GW in the V-PLMN if the V-PLMN-allowed indication indicates that the PDN GW in the V-PLMN is authorized to be selected for the UE for execution of the service and the H-PLMN-allowed indication indicates that the PDN GW in the H-PLMN is not authorized to be selected for the UE for execution of the service.

17. The control node according to claim 13, wherein the control node is further adapted to route the service request to the PDN GW of the H-PLMN if the H-PLMN-allowed indication indicates that the PDN GW in the H-PLMN is authorized to be selected for the UE for execution of the service and the V-PLMN-allowed indicator indicates that the PDN GW in the V-PLMN is not authorized to be selected for the UE for execution of the service.

18. The control node according to claim 13, wherein selection of the PDN GW for routing the service request to the selected PDN GW in a prioritized order is based on if the H-PLMN-allowed indication and the V-PLMN-allowed indication indicate that the PDN GWs in the V-PLMN and in the H-PLMN are both authorized to be selected for the UE for execution of the service.

19. The control node according to claim 13, wherein the control node is a Mobility Management Entity (MME) or a Serving GPRS Support node (SGSN).

20. A method in a control node of a visited public land mobile network (V-PLMN) serving a user equipment (UE), wherein the UE has a subscription with a home public land mobile network (H-PLMN), and wherein the method comprises the steps of:

receive a request for a service from the UE;

receive a H-PLMN-allowed indication indicating whether a packet data network gateway (PDN GW) in the H-PLMN is authorized to be selected for the UE for execution of the service;

receive a V-PLMN allowed indication indicating whether a PDN GW in the V-PLMN is authorized to be selected for the UE for execution of the service; and provide, based on the H-PLMN-allowed indication and the V-PLMN allowed indication, an indication to the UE, whether the UE can expect successful execution of the service, wherein selection of the PDN GW for routing a service request to the selected PDN GW is executed based on the H-PLMN-allowed indication and the V-PLMN-allowed indication in a prioritized order.

21. A register in a home public land mobile network (H-PLMN) storing subscription data of a user equipment (UE), wherein the UE has a subscription with the H-PLMN, and wherein the register is adapted to:

store a H-PLMN-allowed indication, indicating whether a packet data network gateway (PDN GW) in the H-PLMN is authorized to be selected for the UE for execution of the service;

store a visited public land mobile network (V-PLMN)-allowed indication, indicating whether a PDN GW in the V-PLMN is authorized to be selected for the UE for execution of the service; and provide the H-PLMN-allowed indication and the V-PLMN-allowed indication to a control node of the visited PLMN (V-PLMN) which serves the UE, wherein selection of the PDN GW for routing a service request to the selected PDN GW is executed based on the H-PLMN-allowed indication and the V-PLMN-allowed indication in a prioritized order.

22. A register according to claim 21, wherein the H-PLMN-allowed indication is provided in a PDN subscription context.

23. A register according to claim 21, wherein the register is a Home Subscriber Server (HSS).

24. A method in a register of a home public land mobile network (H-PLMN) storing subscription data of a user equipment (UE), wherein the UE has a subscription with the H-PLMN, and wherein the method comprises the steps of:

store a H-PLMN-allowed indication, indicating whether a packet data network gateway (PDN GW) in the H-PLMN is authorized to be selected for the UE for execution of the service;

store a visited public land mobile network (V-PLMN)-allowed indication, indicating whether a PDN GW in the V-PLMN is authorized to be selected for the UE for execution of the service; and provide the H-PLMN-allowed indication and the V-PLMN-allowed indication to a control node of the visited PLMN (V-PLMN) which serves the UE, wherein selection of the PDN GW for routing a service request to the selected PDN GW is executed based on the H-PLMN-allowed indication and the V-PLMN-allowed indication in a prioritized order.

25. A method in a register of a home public land mobile network (H-PLMN) storing subscription data of an user equipment (UE), wherein the UE has a subscription with the H-PLMN, comprising H-PLMN-allowed indication, indicating whether a packet data network gateway (PDN GW) in the H-PLMN is authorized to be selected for the UE for execution of the service, and a visited public land mobile network (V-PLMN)-allowed indication, indicating whether a PDN GW in the V-PLMN is authorized to be selected for the UE for execution of the service, the H-PLMN-allowed indication and the V-PLMN-allowed indication being provided to a control node of the visited PLMN (V-PLMN) which serves the UE, wherein selection of the PDN GW for routing a service request to the selected PDN GW is executed based on the H-PLMN-allowed indication and the V-PLMN-allowed indication in a prioritized order.

* * * * *